US011353322B2

(12) United States Patent
Nagaoka

(10) Patent No.: US 11,353,322 B2
(45) Date of Patent: Jun. 7, 2022

(54) SURFACE CHARACTERISTIC INSPECTION APPARATUS AND SURFACE CHARACTERISTIC INSPECTION PROGRAM

(71) Applicant: HORIBA, Ltd., Kyoto (JP)

(72) Inventor: Eiichi Nagaoka, Kyoto (JP)

(73) Assignee: HORIBA, Ltd., Kyoto (JP)

(*) Notice: Subject to any disclaimer, the term of this patent is extended or adjusted under 35 U.S.C. 154(b) by 0 days.

(21) Appl. No.: 16/767,452

(22) PCT Filed: Dec. 14, 2018

(86) PCT No.: PCT/JP2018/046161
§ 371 (c)(1),
(2) Date: May 27, 2020

(87) PCT Pub. No.: WO2019/117301
PCT Pub. Date: Jun. 20, 2019

(65) Prior Publication Data
US 2020/0370884 A1 Nov. 26, 2020

(30) Foreign Application Priority Data
Dec. 15, 2017 (JP) .............................. JP2017-240832

(51) Int. Cl.
G01B 11/30 (2006.01)
G01B 11/00 (2006.01)
(Continued)

(52) U.S. Cl.
CPC .......... G01B 11/303 (2013.01); G01B 11/002 (2013.01); G01B 11/24 (2013.01); G01N 21/55 (2013.01)

(58) Field of Classification Search
CPC ..... G01B 11/002; G01B 11/24; G01B 11/303; G01N 21/55; G01N 21/57
(Continued)

(56) References Cited

U.S. PATENT DOCUMENTS 5,838,451 A    11/1998  McCarthy
6,449,036 B1 *  9/2002  Wollmann ............. G01B 11/24
                                                    356/237.1
(Continued)

FOREIGN PATENT DOCUMENTS

JP    H07270238 A    10/1995
JP    2000131243 A    5/2000
(Continued)

OTHER PUBLICATIONS

ISA Japan Patent Office, International Search Report Issued in International Application No. PCT/JP2018/046161 dated Mar. 12, 2019, WIPO, 4 pages.
(Continued)

Primary Examiner — Tri T Ton
(74) Attorney, Agent, or Firm — Alleman Hall Creasman & Tuttle LLP

(57) ABSTRACT

The present invention is intended to make it easier to perform positioning of a detection device when detecting surface characteristics of a sensing object. The invention includes a detection device, a processing part, a guidance information generation part and an informing part. The detection device detects reflection light from a sensing object by irradiating light onto the sensing object. The processing part calculates surface characteristics of the sensing object by processing data from the detection device. The guidance information generation part generates information about a distance and/or an attitude of the detection device relative to the sensing object. The informing part informs the information about the distance and/or the attitude generated by the guidance information generation part.

12 Claims, 10 Drawing Sheets

(51) Int. Cl.
*G01B 11/24* (2006.01)
*G01N 21/55* (2014.01)

(58) Field of Classification Search
USPC ..... 356/600–613, 237.1–237.6, 239.1–239.8
See application file for complete search history.

(56) References Cited

U.S. PATENT DOCUMENTS

| | | |
|---|---|---|
| 2005/0030542 A1 | 2/2005 | Schwarz |
| 2005/0157278 A1 | 7/2005 | Owa et al. |
| 2010/0157278 A1* | 6/2010 | Horsch .................... G01S 17/48 |
| | | 356/3.01 |
| 2011/0178669 A1* | 7/2011 | Tanaka ................. G05D 1/0088 |
| | | 701/25 |
| 2015/0278992 A1* | 10/2015 | Smits ..................... G02B 30/35 |
| | | 345/660 |

FOREIGN PATENT DOCUMENTS

| | | |
|---|---|---|
| JP | 2006284550 A | 10/2006 |
| JP | 2009080044 A | 4/2009 |
| JP | 2010066273 A | 3/2010 |
| JP | 2010127661 A | 6/2010 |
| JP | 2015125621 A | 7/2015 |
| JP | 2016038222 A | 3/2016 |
| JP | 2017129561 A | 7/2017 |

OTHER PUBLICATIONS

Japan Patent Office, Office Action Issued in Application No. 2019559232, dated Jan. 21, 2022, 9 pages.

\* cited by examiner

SURFACE CHARACTERISTIC INSPECTION APPARATUS AND SURFACE CHARACTERISTIC INSPECTION PROGRAM

BACKGROUND OF THE INVENTION

Field of the Invention

The present invention relates to a surface characteristic inspection apparatus and a surface characteristic inspection program which are intended to calculate surface characteristics of a sensing object by detecting reflection light from the sensing object.

Background Art

Conventionally, there has been a gloss meter that measures reflectance or glossiness as a surface characteristic of a sensing object (Patent Document 1).

The above gloss meter is portable and designed so that distances and attitudes of a light source and a photodetector relative to the sensing object are brought into a state suitable for measurement by bringing a casing accommodating therein the light source and the photodetector into contact with the sensing object.

However, in cases where a surface of the sensing object is not a flat surface or the sensing object is soft or liquid, it is difficult to bring the distances and attitudes of the light source and the photodetector relative to the sensing object into the state suitable for measurement even by their contacts with the casing.

For each of these sensing objects, it is conceivable to measure surface characteristics without any contact with the sensing object. It is however difficult to perform positioning of the distances and attitudes of the light source and the photodetector relative to the sensing object without any contact with the sensing object.

PRIOR ART DOCUMENT

Patent Document

Patent Document 1: Japanese Unexamined Patent Publication No. 2010-127661

SUMMARY OF THE INVENTION

Problems to be Solved by the Invention

The present invention has been made to solve the above problem and has for its main object to facilitate positioning of a detection device when detecting surface characteristics of a sensing object.

Means for Solving the Problems

A surface characteristic inspection apparatus in one of embodiments of the present invention includes a detection device, a processing part, a guidance information generation part, and an informing part. The detection device detects reflection light from a sensing object by irradiating light onto the sensing object. The processing part calculates surface characteristics of the sensing object by processing data from the detection device. The guidance information generation part generates information about a distance and/or an attitude of the detection device relative to the sensing object. The informing part informs the information about the distance and/or the attitude generated by the guidance information generation part.

With the surface characteristic inspection apparatus including the informing part that informs the information about the distance and/or the attitude of the detection device relative to the sensing object, a user is capable of adjusting the position of the detection device on the basis of the information. This facilitates positioning of the detection device when detecting the surface characteristics of the sensing object.

In order that the information about the distance and/or the attitude of the detection device relative to the sensing object can be recognized at a glance, the informing part preferably displays on a display the information about the distance and/or the attitude.

The guidance information generation part preferably generates the information about the distance and/or the attitude to establish an attitude so that the detection device receives reflection light reflected at a predetermined angle relative to a normal line of a surface of the sensing object irradiated with the light from the detection device. The reflection light is preferably specular reflection light.

With the above configuration, it is possible to highly accurately detect the reflection light reflected from the surface of the sensing object. It is therefore possible to highly accurately calculate, for example, the distance to the sensing object and the reflectance of the sensing object.

According to the surface shape of the sensing object, the reflection light detected by the detection device may change, and surface characteristics calculated may change.
In cases where the detection device includes an imaging part including a plurality of two-dimensionally arranged light-receiving elements, the processing part is capable of recognizing a surface shape of the sensing object by using data from the imaging part. Hence, the processing part preferably corrects the surface characteristics according to the recognized surface shape.

For example, if the surface shape of the sensing object is a curved surface, it is conceivable to correct the influence of a magnitude of a curvature of the curved surface on a distribution state of specular reflection light.

The detection device preferably further includes a light source to irradiate light onto the inspection object, and a light source control part to modulate emission intensity of the light source at a predetermined frequency. The processing part preferably calculates surface characteristics of the sensing object by using the detection data synchronized with a modulation frequency of the emission intensity.

With this configuration, it is possible to reduce the influence of disturbance light and the influence of multi-pass reflection.

Specifically, it is conceivable that the processing part calculates a reflectance of the sensing object from the detection data synchronized with the modulation frequency of the emission intensity.

A specific embodiment of the detection device is preferably one which generates data including a depth image of the sensing object and a brightness image of the sensing object.

In this case, it is conceivable to use a TOF (time of flight) camera as the detection device.

Specular reflection light has light intensity more than two orders of magnitude higher than that of diffuse reflection light. Therefore, if the same light receiving conditions (for example, irradiation light intensity and exposure time) are applied to the specular reflection light and the diffuse reflection light, detection sensitivity of at least one of the specular reflection light and the diffuse reflection light may become insufficient.

Hence, the surface characteristic inspection apparatus of the present invention preferably includes a first light receiving mode to receive specular reflection light from the sensing object, and a second light receiving mode to receive diffuse reflection light from the sensing object. Specifically, exposure time by the detection device is preferably set short in the first light receiving mode, and exposure time by the detection device is preferably set long in the second light receiving mode.

This configuration makes it possible to establish conditions suitable for receiving the specular reflection light in the first light receiving mode, and conditions suitable for receiving the diffuse reflection light in the second light receiving mode. Consequently, a dynamic range (measurement range) in brightness measurement can be enlarged.

The processing part preferably calculates surface characteristics of the sensing object by using data from the detection device in the first light receiving mode and data from the detection device in the second light receiving mode.

With this configuration, the surface characteristics of the sensing object can be calculated using both the specular reflection light and the diffuse reflection light, thereby it is possible to improve measurement accuracy of the surface characteristics. In cases where the processing part is designed to obtain data including a depth image, it is possible to improve measurement accuracy of a distance to the sensing object.

Depending on a surface texture of a sensing object, reflection characteristics thereof differs. The reflection characteristics appear in brightness distribution.

Therefore, the processing part preferably calculates a brightness distribution of the sensing object by using data from the detection device, and displays the brightness distribution on a display.

The surface state of the sensing object is evaluable by so displaying the brightness distribution.

A surface characteristic inspection program in one of embodiments of the present invention is designed to cause a computer to function as an acceptance part, a processing part, a guidance information generation part and an informing part. The acceptance part accepts data from a detection device designed to detect reflection light from a sensing object by irradiating light onto the sensing object. The processing part calculates surface characteristics of the sensing object by processing data from the detection device. The guidance information generation part generates information about a distance and/or an attitude of the detection device relative to the sensing object. The informing part informs the information about the distance and/or the attitude generated by the guidance information generation part. Besides the above, a storage medium storing the surface characteristic inspection program therein is also one of embodiments of the present invention.

Effect of the Invention

With the present invention as described above, it is easy to perform positioning of the detection device when detecting surface characteristics of the sensing object because of the informing part to inform information about the distance and/or the attitude of the detection device relative to the sensing object.

Figure 1:
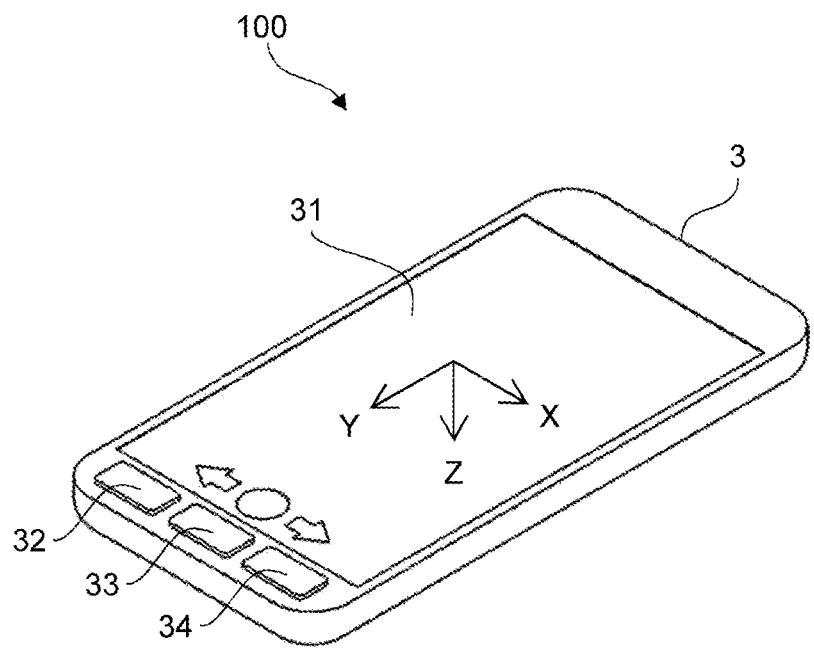
FIG. 1 is a general schematic diagram of a surface characteristic inspection apparatus in one of embodiments of the present invention.
Figure 1:
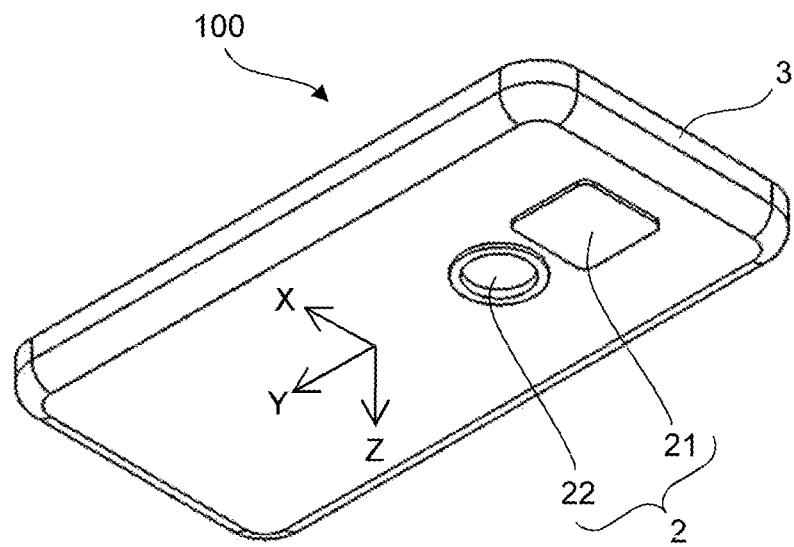

LIST OF THE REFERENCE CHARACTERS 100 surface characteristic inspection apparatus
W sensing object
2 detection device
21 light source part
21$a$ light source
21$b$ light source control part
22 imaging part
22$a$ imaging element
22$b$ brightness image generation part
22$c$ depth image generation part
3 apparatus body
31 display
32-34 operation buttons
3$a$ acceptance part
3$b$ processing part
3$c$ display control part (guidance information generation part, and informing part)
31$a$-31$f$ guidance part
31$g$ preparation completion part

MODE FOR CARRYING OUT THE INVENTION

A surface characteristic inspection apparatus in one of embodiments of the present invention is described below with reference to the drawings.

<Overall Configuration>

The surface characteristic inspection apparatus 100 is a portable type in the present embodiment which is disposed away from a sensing object W and inspects surface characteristics of the sensing object W in a non-contact manner. The surface characteristics serve as an index of appearance and surface state of the sensing object W, and include, for example, optical characteristics such as reflectance and brightness distribution of a surface W1, or criteria indicating quality of a mechanically processed state i.e. surface texture, such as surface roughness and waviness, and indexes for determining quality of specially processed state, such as hairline processing.

Specifically, the surface characteristic inspection apparatus 100 includes a detection device 2 to detect reflection light by irradiating light onto the sensing object W, and an apparatus body 3 to process data from the detection device 2 as illustrated in FIG. 1. The detection device 2 is configured as an integral casing held in the apparatus body 3 in the present embodiment.

Alternatively, the detection device 2 and the apparatus body 3 may be independent casings and data-communicably connected to each other in a wired or wireless manner.

Figure 2:
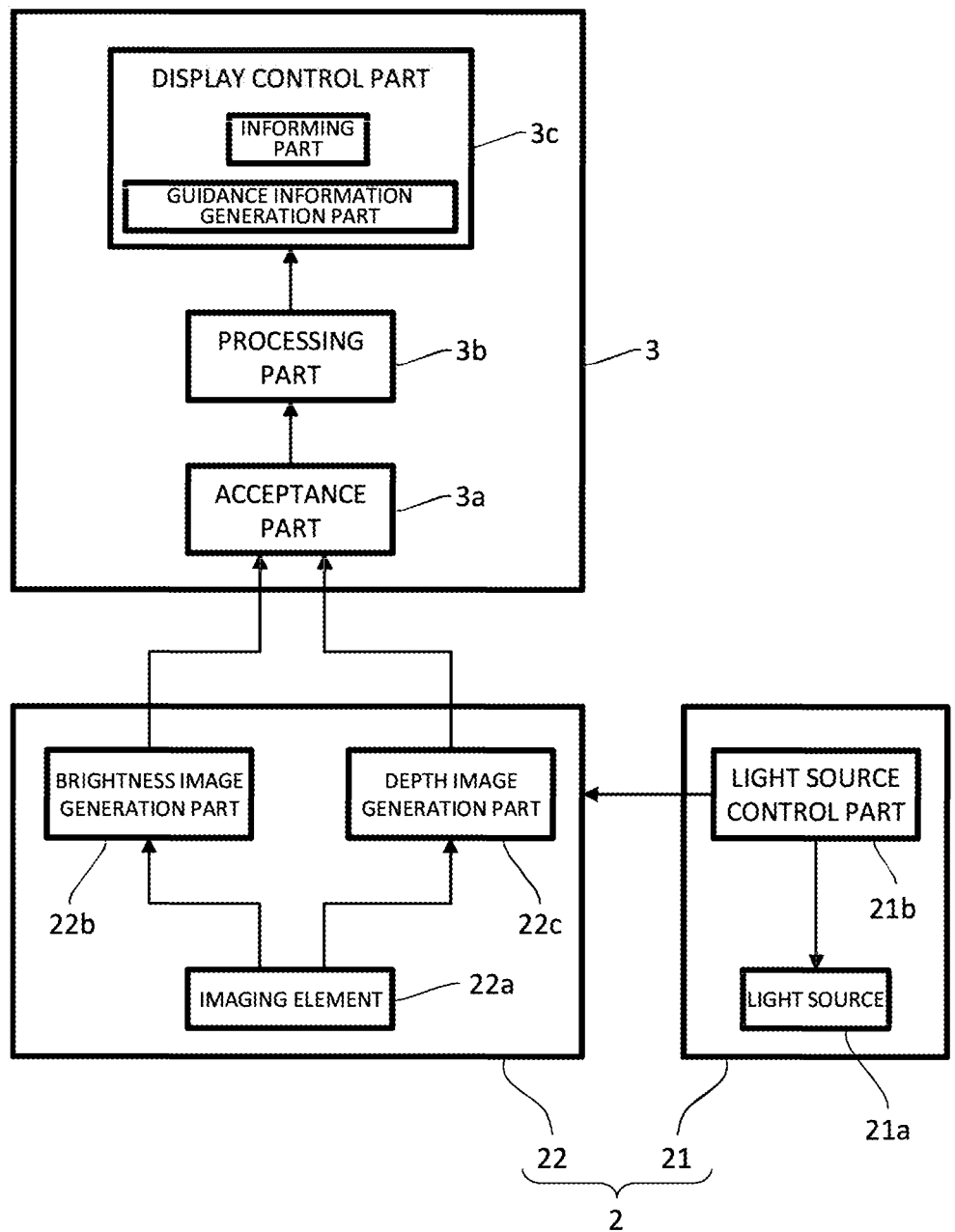
FIG. 2 is a functional block diagram of the surface characteristic inspection apparatus in the embodiment.

The detection device 2 includes a light source part 21 to irradiate light onto the sensing object W, and an imaging part 22 to image the surface of the sensing object W by detecting the light reflected from the sensing object W as illustrated in FIG. 2. The detection device 2 is configured to generate data including depth image data and brightness image data about the sensing object W in the present embodiment.

Specifically, the light source part 21 includes a light source 21a to emit, for example, infrared light, and a light source control part 21b to modulate emission intensity of the light source 21a at a predetermined frequency. The light source control part 21b is intended to modulate the emission intensity at high speed, for example, by using high frequency sine wave or square wave of 10 MHz in the present embodiment. The light source part 21 is intended to emit light toward a shooting range of the imaging part 22.

The imaging part 22 is configured to output imaging data synchronized with a modulation frequency for the light source 21. Specifically, the imaging part 22 outputs the depth image data and brightness image data of the sensing object W by TOF (time of flight) method.

The imaging part 22 is composed of an imaging element 22a, a brightness image generation part 22b and a depth image generation part 22c. The imaging element 22a includes a plurality of two-dimensionally arranged pixels. The brightness image generation part 22b generates brightness image data of the sensing object W on the basis of the amount of accumulated charge in each of the pixels in the imaging element 22a. The depth image generation part 22c generates depth image data of the sensing object W on the basis of the amount of accumulated charge of each of the pixels in the imaging element 22a.

The imaging element 22a is configured so that the amount of accumulated charge of light-generated pixel charge is readable from the outside. The imagining element 22a in the present embodiment is a PMD (photonic mixer device) using CMOS of switching charge stored method. Each pixel includes two charge accumulation parts disposed for one photodiode (light-receiving element). With the imaging element 22a, a charge due to incident light is switched into two charge accumulation parts in synchronization with the modulation frequency for the light source 21. Exposure time T of the imaging element 22a is adjustable.

The imaging element 22a preferably includes a wavelength filter so as to receive only light in the vicinity of a wavelength of light emitted from the light source 21a (for example, 880 nm for infrared). If the exposure time T of the imaging element 22a becomes longer, accumulation of electric charge due to dark current generated in photoelectric conversion parts of the individual pixels (electric charge generated without irradiation of light) reaches a non-negligible amount. Because an equal amount of a component not synchronized with the modulation frequency for the light source 21a is accumulated in each of the two charge accumulation parts, the imaging element 22a preferably includes a circuit for compensating (cancelling) the above. These contrivances make it possible to carry out imaging in a longer range of exposure time T while eliminating influences of disturbance light.

The depth image generation part 22c reads the charge distributed into the two charge accumulation parts disposed on the individual pixels, calculates a phase difference between outgoing light from the light source 21a and reflection light on the basis of a read-out result, and generates distance image data i.e. depth image data on the basis of a calculation result thereof.

The imaging part 22 is capable of measuring a distance D (x,y) to the sensing object W with respect to a plurality of pixels P (x,y) and intensity I (x,y) of the reflection light from the sensing object W. In the above, x is a number (1 to m) given to the pixels in a horizontal direction (x direction), and y is a number (1 to n) applied to the pixels in a vertical direction (y direction). D(x,y) and I(x,y) are less susceptible to the influence of disturbance light and multi-pass reflection because of a configuration so that the imaging element 22a is capable of reading only a component synchronized with the modulation frequency for the light source 21a.

The apparatus body 3 is intended to calculate surface characteristics of the sensing object by processing the depth image data and the brightness image data from the detection device 2. Specifically, the apparatus body 3 is a general-purpose and special-purpose computer including, as a structure thereof, CPU, memory, input/output interface, AD convertor, display 31, input means (operation buttons 32 to 34), or the like. The apparatus body 3 performs at least functions as, for example, an acceptance part 3a, a processing part 3b, and a display control part 3c, as illustrated in FIG. 2 by operations of the CPU and peripheral devices thereof according to a surface characteristic inspection program stored in the memory. Besides the above, the apparatus body 3 includes a main control part to control information processing from a measurement start to a measurement termination in the surface characteristic inspection apparatus 100. The main control part may be disposed in a host computer separate from the apparatus body 3. The display 31 may be separate from the apparatus body 3.

The acceptance part 3a accepts brightness image data from the brightness image generation part 22b of the detection device 2, and also accepts depth image data from the depth image generation part 22c. The brightness image data and the depth image data accepted by the acceptance part 3a are designed to be displayed on the display 31.

Figure 3:
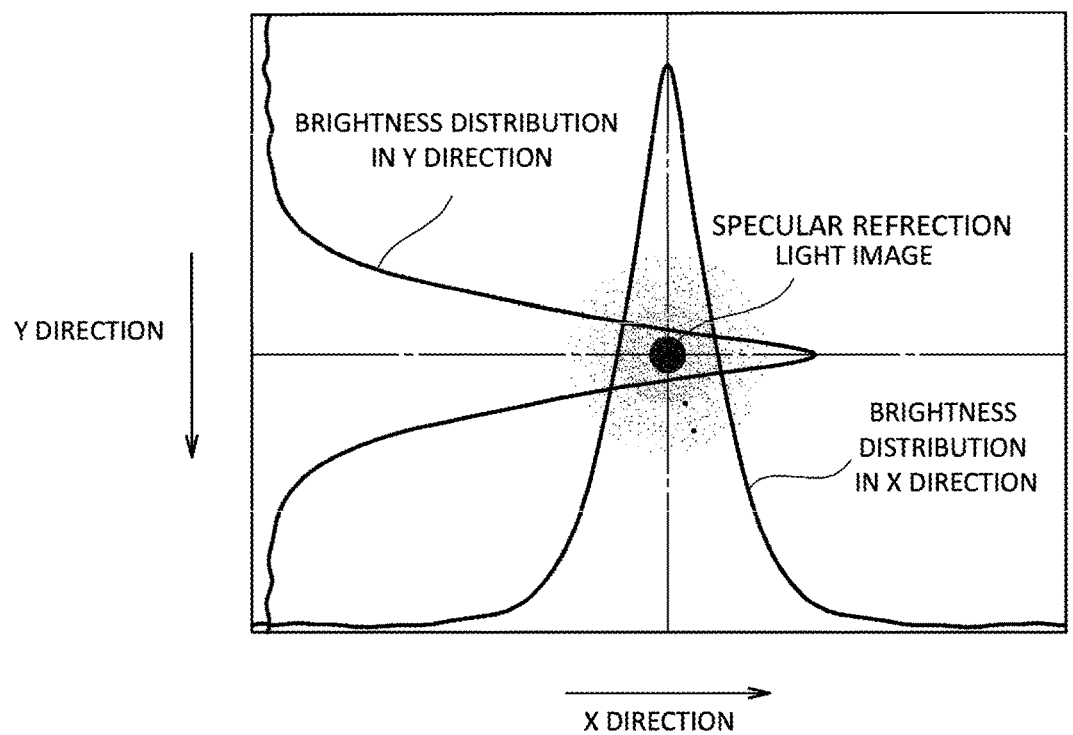
FIG. 3 is a diagram illustrating a two-dimensional brightness distribution in the embodiment.
Figure 4:
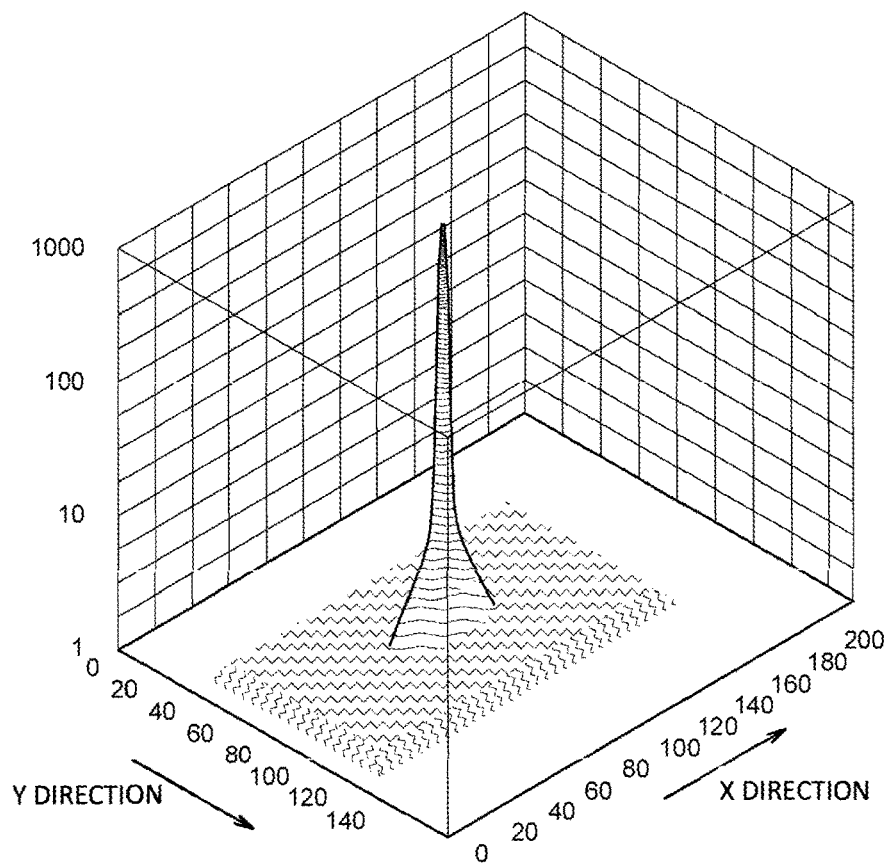
FIG. 4 is a diagram illustrating a three-dimensional brightness distribution in the embodiment.

The processing part 3b functions as a surface characteristic calculation part to calculate surface characteristics of the sensing object W and a value related to the surface characteristics by using the brightness image data and the depth image data accepted by the acceptance part 3a. Specifically, the processing part 3b calculates reflectance properties of the sensing object W (for example, reflectance) by using light intensity of specular reflection light included in the brightness image data. The processing part 3b calculates a two-dimensional brightness distribution (refer to FIG. 3) or a three-dimensional brightness distribution (refer to FIG. 4) of the sensing object W by using the brightness image data. The brightness is a value obtained by taking the logarithm of intensity I (x, y) of the reflection light from the sensing object W. FIG. 3 illustrates an embodiment in which the display control part 3c displays by overlapping a brightness distribution with a brightness image. Alternatively, both may be displayed independently of one another. Still alternatively, the display control part 3c may display a cross-sectional shape (contour lines) in a three-dimensional brightness distribution. The display of the cross-sectional shape of the brightness distribution makes it possible for a user to evaluate anisotropy of the reflectance of the sensing object W and evaluate a surface state of the sensing object W according to the cross-sectional shape and an aspect ratio. The processing part 3b may have brightness distribution data of a standard sample so as to evaluate, for example, a surface state of the sensing object W by comparing brightness distribution data obtained by imaging the sensing object W and brightness distribution data of the standard sample. Alternatively, a difference in brightness value between the two (the sensing object W and the standard sample) may be obtained and displayed.

The processing part 3b may generate transformed image data indicating a transformed image by subjecting the brightness image data accepted by the acceptance part 3a to nonlinear transformation. The nonlinear transformation uses logarithmic transformation because human perception relative to brightness is proportional to brightness logarithm according to Weber-Fechner law. To be subjected to the logarithmic transformation, the brightness image data need to be an image having a dynamic (wide) range enough to be subjected to the logarithmic transformation. Specifically, the imaging part 2 preferably generates brightness image data by HDR (high dynamic range) synthesis. For example, index (exponential) transformation or gamma (power law) transformation may be used as other nonlinear transformation.

The display control part 3c displays on the display 31 not only the brightness image and the depth image as described above, but also data obtained by the processing part 3b.

The display control part 3c generates information about the distance and attitude of the detection device 2 relative to the sensing object W (hereinafter also referred to as guidance information), and causes the display 31 to display the guidance information thereon. The guidance information are thus generated and displayed on the display 31 by the display control part 3c. This makes it possible for the display control part 3c to function as a guidance information generation part and an informing part with which a user is capable of putting the detection device 2 at a position suitable for measurement.

The guidance information are information about a direction to move the detection device 2 in order to bring the distance relative to the sensing object W into a predetermined value suitable for measurement, and information about a direction to rotationally move the detection device 2 in order to bring the attitude relative to the sensing object W into an attitude suitable for measurement. The guidance information also include displaying the brightness image itself or depth image itself obtained by the detection device 2 on the display 31. The guidance information further includes displaying, on the display 31, the distance itself relative to the sensing object W, and the attitude itself, such as angle and direction relative to the sensing object W, which are obtained by the detection device 2. The guidance information may be, besides information generated on the basis of the distance and attitude relative to the sensing object W, information generated on the basis of the surface characteristics obtained by the processing part.

Specifically, the display control part 3c displays the guidance information on the display 31 so that the detection device 2 is brought into a distance and an attitude to receive specular reflection light from the sensing object W. The guidance information are specifically described later.

<Guidance Function>

With the surface characteristic inspection apparatus 100 in the present embodiment, the two-dimensional distribution state of the distance D (x, y) can be found from the depth image data, and the two-dimensional distribution state of the reflection light intensity I (x, y) can be found from the brightness image data. The surface state of the sensing object W is evaluable from the two-dimensional distribution state of the reflection light intensity I (x, y).

Thus, in order to evaluate the surface state, it is necessary to measure the two-dimensional distribution states of the specular reflection light and diffuse reflection light from the sensing object W. In particular, it is an important point to find intensity and distribution of a component that is present around specular reflection light and reflects in a direction different from the specular reflection light. The term "specular reflection light" denotes reflection light whose incidence angle and emergence angle are equal to each other with respect to a normal direction of the surface of the sensing object W from a macroscopic viewpoint.

Therefore, at least the specular reflection light in the reflection light, which is emitted from the light source part 21 and then reflected from the sensing object W, needs to enter the imaging part 22, preferably around a center of the two-dimensionally arranged pixels P (x, y) in the imaging part 22. Specifically, the specular reflection light preferably enters in the vicinity of a pixel located at xc=m/2 in the horizontal direction and yc=n/2 in the vertical direction. Hereinafter, the pixel at around the center is referred to as Pc (xc, yc).

In order that the specular reflection light enters in the vicinity of the pixel Pc (xc, yc) at around the center, the distance to the sensing object W and the attitude relative to the sensing object W need to be held in an appropriate state. With the present embodiment, the distance and attitude can be held in the appropriate state by employing the following method, without any contact with the sensing object W.

Upon pressing a start button 32 of the apparatus body 3 by a user, the imaging part 22 measures distances D (x, y) to the sensing object W and intensities I (x, y) of the reflection light from the sensing object W with respect to a plurality of pixels P(x, y), the processing part 3b performs the following determination processing, and the display control part 3c displays various information on the display 31. Although FIG. 1 imaginarily illustrates, on the display 31, two directions of an X axis and a Y axis vertical to a Z axis that is a measurement axis, these may individually coincide with a pixel arrangement direction in the imaging part 22. Similarly, the Z axis that is the measurement axis may coincide with an optical axis direction of the imaging part 22.

<<Determination 1>>

The processing part 3b finds a distance to the sensing object W in a neighborhood area of the pixel Pc (xc, yc) at around the center among the distances D (x, y) to the sensing object W. Thus, the processing part 3b functions as a distance calculation part. As the distance, a distance D (x, y) of a single pixel may be used or, alternatively, an average value of distances in a plurality of pixels may be used. Besides the above, measurement results of the distance D (x, y) in a plurality of pixels may be used to approximate to a flat surface or curved surface expressed by polynomial or the like, and a distance may be found from a result thereof.

Figure 5:
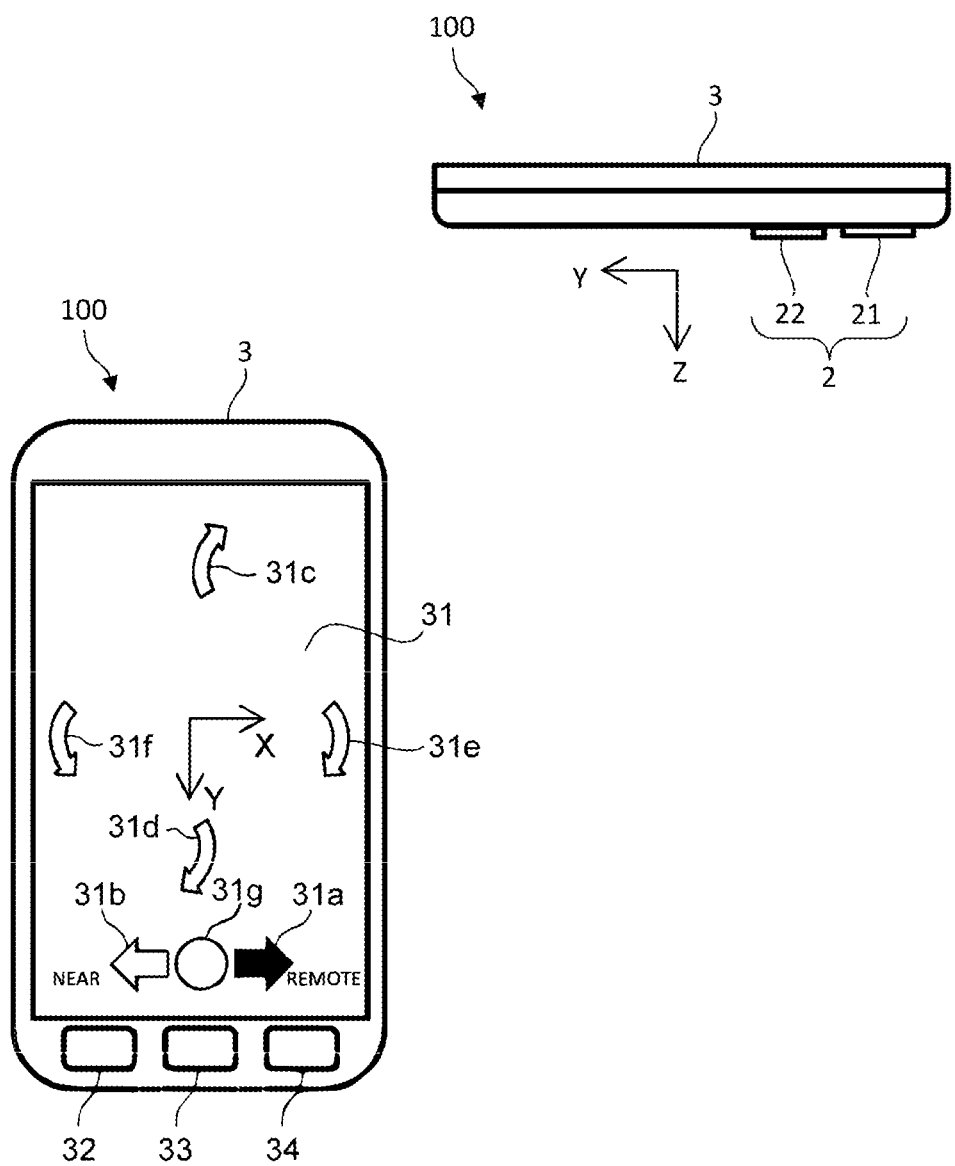
FIG. 5 is a diagram illustrating a guidance function (at a large distance) in the surface characteristic inspection apparatus of the embodiment.
Figure 5:
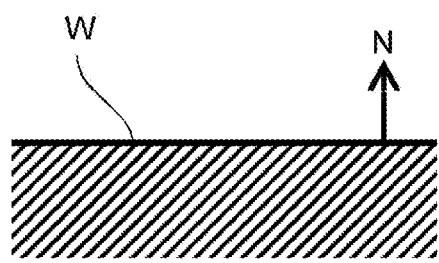

The display control part 3c (guidance information generation part) compares the distance obtained by the processing part 3b and a predetermined first distance threshold value. If a comparison result shows that the obtained distance is larger than the first distance threshold value, for example, if the surface characteristic inspection apparatus 100 is put at a distance of 1 m or more from the sensing object W, the display control part 3c generates guidance information for moving the surface characteristic inspection apparatus 100 in a direction to approach the sensing object W. As illustrated in FIG. 5, the display control part 3c (informing part) informs the user of the information by performing a guidance display indicating the information on the display 31. For example, the display control part 3c (informing part) displays on the display 31 a guidance part (arrow indication) 31a that indicates being larger than the first distance threshold value, and turns on (flashes) a display thereof to inform the user of the display in order to urge the user to move the surface characteristic inspection apparatus 100 in the direction in which the apparatus 100 approaches the sensing object W.

Figure 6:
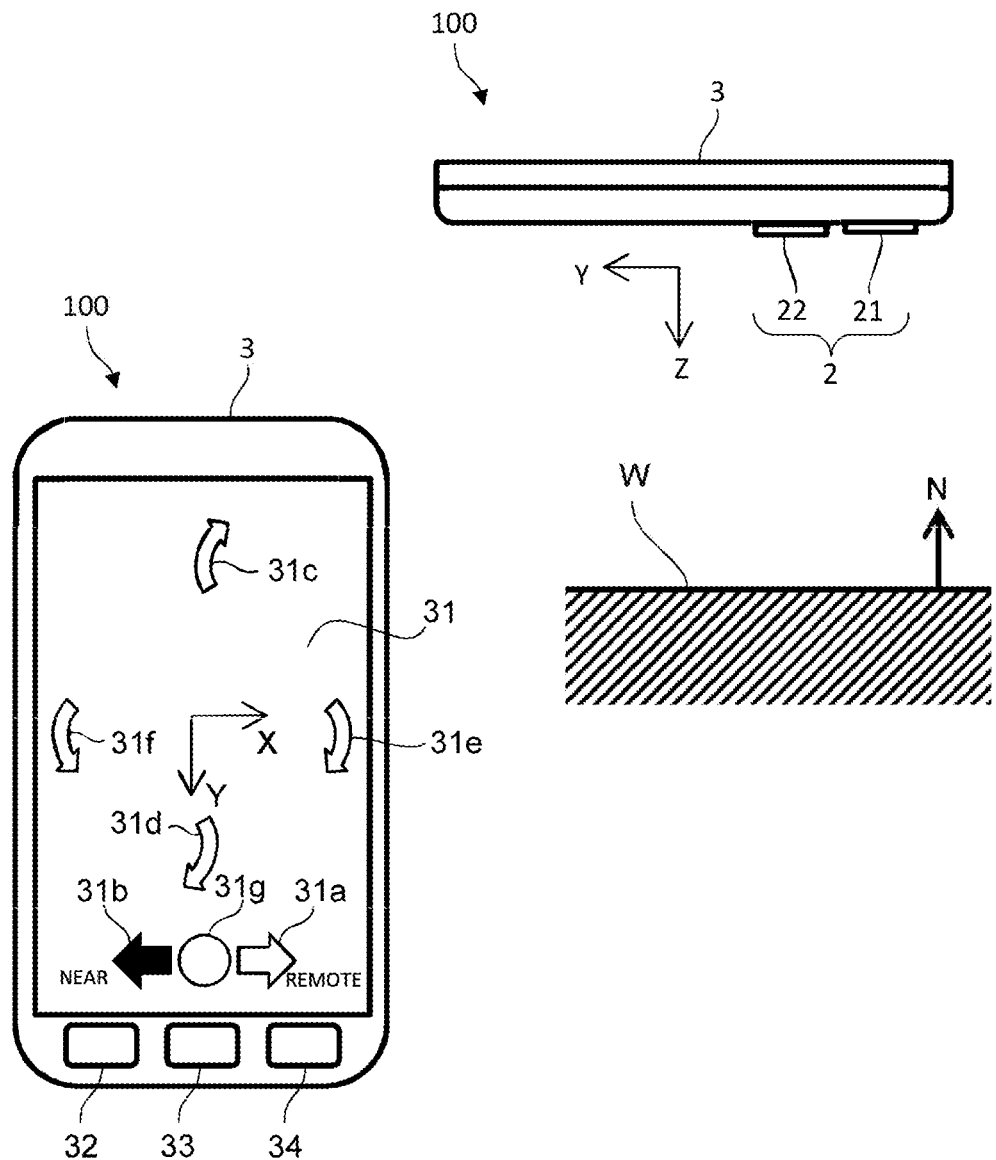
FIG. 6 is a diagram illustrating a guidance function (at a small distance) in the surface characteristic inspection apparatus of the embodiment.

The display control part 3c (guidance information generation part) also compares the distance obtained by the processing part 3b and a predetermined second distance threshold value. If a comparison result shows that the obtained distance is smaller than the second distance threshold value, for example, if the surface characteristic inspection apparatus 100 is put at a distance of 0.05 m or less from the sensing object W, the display control part 3c generates guidance information for moving the surface characteristic inspection apparatus 100 in a direction to separate from the sensing object W. As illustrated in FIG. 6, the display control part 3c (informing part) informs the user of this information by performing a guidance display indicating the information on the display 31. For example, the display control part 3c (informing part) displays on the display 31 a guidance part (arrow indication) 3 lb that indicates being smaller than the second distance threshold value, and turns on (flashes) a display thereof to inform the user of the display in order to urge the user to move the surface characteristic inspection apparatus 100 in the direction in which the apparatus 100 is moved away from the sensing object W.

With the above guidance display on the display 31, it is easier for the user to put the surface characteristic inspection apparatus 100 at a distance suitable for measurement with respect to the sensing object W by moving the surface characteristic inspection apparatus 100 so that neither the guidance part 31a nor 31b lights up.

<<Determination 2>>

The processing part 3b obtains a rotation angle around the X axis of the surface characteristic inspection apparatus 100 with respect to a normal vector N of the surface of the sensing object W by comparing a plurality of pixels in terms of distance D (x, y) to the sensing object W. Thus, the processing part 3b functions as an attitude calculation part. Besides the above, measurement results of the distance D (x, y) to the plurality of pixels may be used to approximate to a flat surface or curved surface expressed by polynomial or the like, and a rotation angle around the X axis may be obtained from a result thereof.

Figure 7:
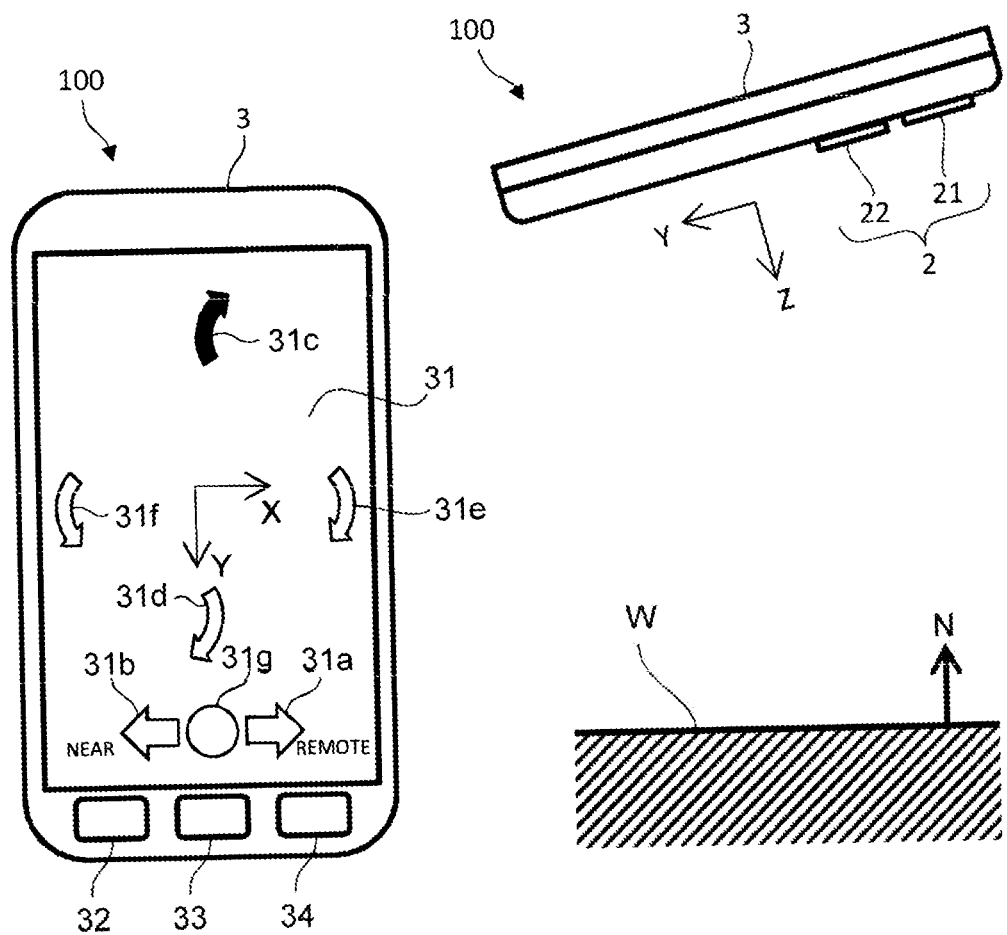
FIG. 7 is a diagram illustrating a guidance function (in the presence of positive rotation around an X axis) in the surface characteristic inspection apparatus of the embodiment.

The display control part 3c (guidance information generation part) compares the rotation angle obtained by the processing part 3b and a predetermined first angle threshold value. If a comparison result shows that the obtained rotation angle is larger in a positive direction than the first angle threshold value, for example, if the surface characteristic inspection apparatus 100 is inclined 5° or more, the display control part 3c generates guidance information for rotationally moving the attitude of the surface characteristic inspection apparatus 100 in a negative direction around the X axis. As illustrated in FIG. 7, the display control part 3c (informing part) informs the user of the information by performing a guidance display indicating the information on the display 31. For example, the display control part 3c (informing part) displays on the display 31 a guidance part (arrow indication) 31c that indicates being inclined in the positive direction than the first angle threshold value, and turns on (flashes) a display thereof to inform the user of the display in order to urge the user to rotationally move the attitude of the surface characteristic inspection apparatus 100 in the negative direction around the X axis. In terms of the rotation angle around the X axis, an angle at which the Z axis that is the measurement axis coincides with the normal direction of the sensing object W is set to zero.

Figure 8:
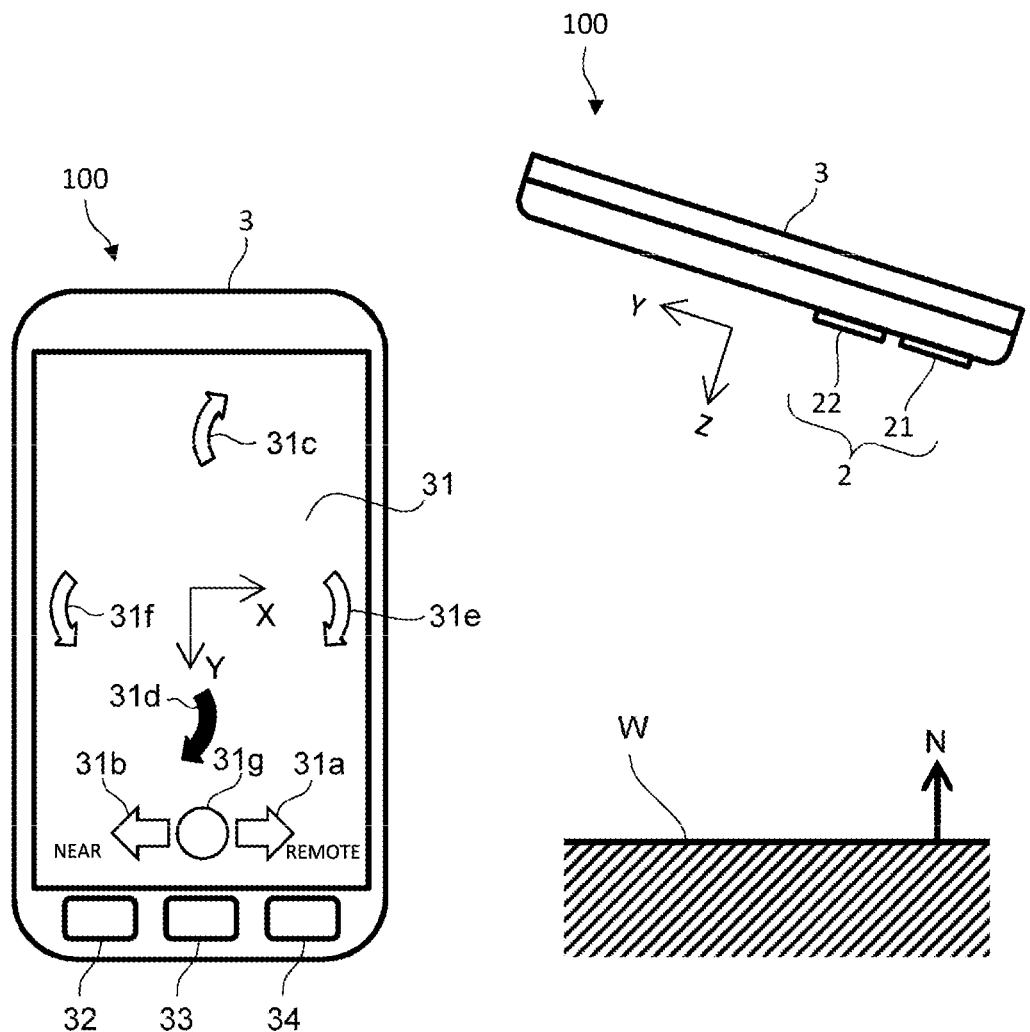
FIG. 8 is a diagram illustrating a guidance function (in the presence of negative rotation around the X axis) in the surface characteristic inspection apparatus of the embodiment.

The display control part 3c (guidance information generation part) also compares the rotation angle around the X axis obtained by the processing part 3b and a predetermined second angle threshold value. If a comparison result shows that the obtained rotation angle (an absolute value thereof) is larger in a negative direction than the second angle threshold value, for example, if the surface characteristic inspection apparatus 100 is inclined −5° or more, the display control part 3c generates guidance information for rotationally moving the attitude of the surface characteristic inspection apparatus 100 in a positive direction around the X axis. As illustrated in FIG. 8, the display control part 3c (informing part) informs the user of the guidance information by performing a guidance display indicating the guidance information on the display 31. For example, the display control part 3c (informing part) displays on the display 31 a guidance part (arrow indication) 31d that indicates being inclined in the negative direction than the second angle threshold value, and turns on (flashes) a display thereof to inform the user of the display in order to urge the user to rotationally move the attitude of the surface characteristic inspection apparatus 100 in the positive direction around the X axis.

With the above guidance display on the display 31, it is easier for the user to adjust the attitude of the surface characteristic inspection apparatus 100 around the X axis with respect to the sensing object W by moving the surface characteristic inspection apparatus 100 so that neither the guidance part 31c nor 31d lights up.

Similarly to the determination 2, the processing part 3b obtains a rotation angle around the Y axis of the surface characteristic inspection apparatus 100. In terms of the rotation angle around the Y axis, an angle at which the Z axis that is the measurement axis coincides with the normal direction of the sensing object W is set to zero. The display control part 3c (guidance information generation part) compares the rotation angle around the Y axis obtained by the processing part 3b with predetermined angle threshold values respectively set in the positive direction and the negative direction around the Y axis. According to a comparison result, the display control part 3c generates guidance information for rotationally moving the attitude of the surface characteristic inspection apparatus 100 in the positive or negative direction around the Y axis. Then, the display control part 3c (informing part) displays guidance parts (arrow displays) 31e or 31f as necessary, and turns on (flashes) them in order to urge the user to rotationally move the attitude of the surface characteristic inspection apparatus 100 in the positive or negative direction around the Y axis.

With the above guidance display on the display 31, it is easier for the user to adjust the attitude of the surface characteristic inspection apparatus 100 around the Y axis with respect to the sensing object W by moving the surface characteristic inspection apparatus 100 so that neither the guidance part 31e nor 31f lights up.

<<Determination 4>>

Figure 9:
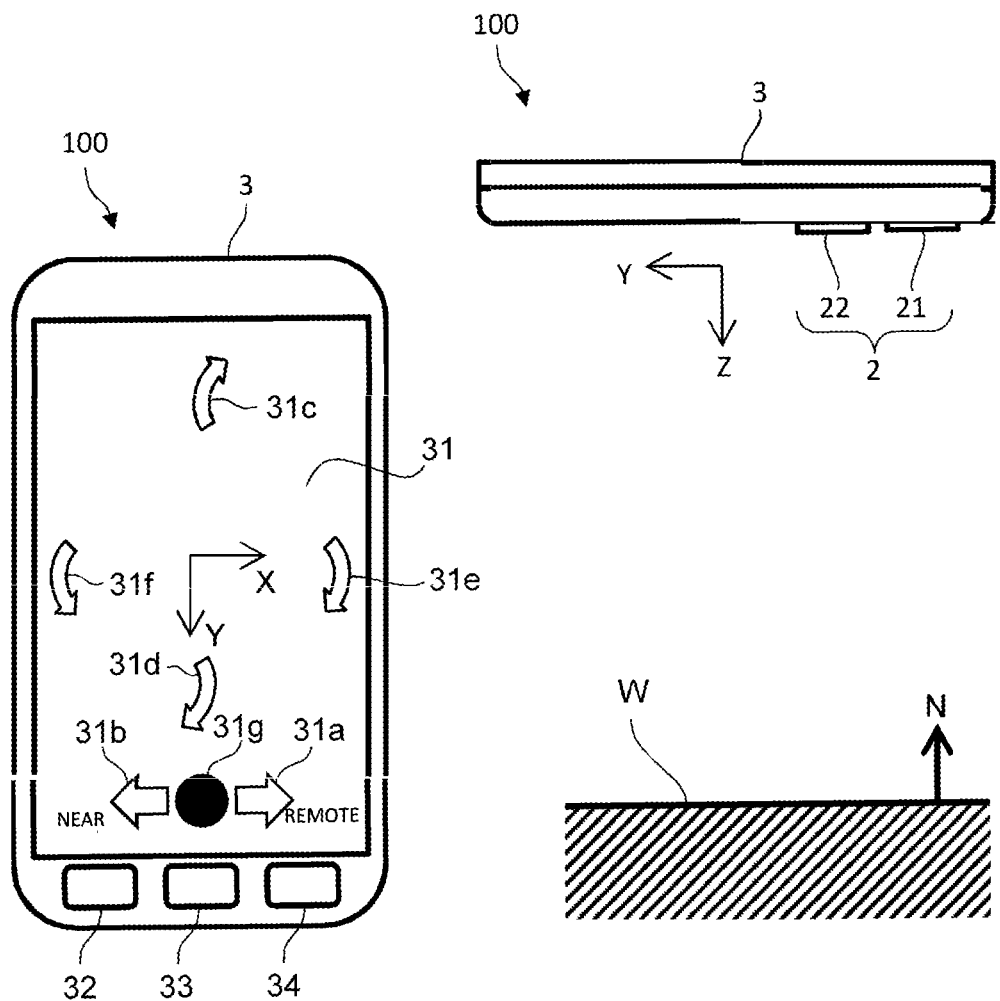
FIG. 9 is a diagram illustrating a guidance function (in a measurable state) in the surface characteristic inspection apparatus of the embodiment.

As a result of the determinations 1 to 3 thus made, if it becomes a state in which none of the guidance parts 31a to 31f turn on (blink), the display control part 3c (guidance information generation part) generates guidance information indicating that the distance and attitude of the surface characteristic inspection apparatus 100 with respect to the sensing object W fall within an appropriate range. The display control part 3c (informing part) informs the user of the information by carrying out a preparation completion display indicating the information on the display 31. For example, the display control part 3c informs the user of a measurable state in order to urge the user to start execution of a surface characteristic inspection by displaying a preparation completion part 31g that indicates the preparation completion, and by turning on (blinking) the preparation completion part 31g as illustrated in FIG. 9. When the user presses a measurement button 33 in this state, the inherent surface characteristic inspection proceeds.

The foregoing determinations 1 to 4 are preferably carried out for each frame in conjunction with a frame rate of the imaging part 22. This is for the purpose of reducing a display lag relative to a user operation.

When obtaining the distance or attitude relative to the sensing object W in the determinations 1 to 3, it is also possible to select the pixels used by referring to the intensity I (x, y) of the reflection light from the sensing object W. That is, only pixels whose reflection light intensity I (x, y) falls within the predetermined range are preferably used for the determinations 1 to 3. This is also true for the case of approximating to the flat surface or curved surface expressed by polynomial or the like. Only the pixels whose reflection light intensity I (x, y) falls within a predetermined range need to be used for least squares method or the like. If the reflection light intensity I (x, y) is too large, it is an overflow state and hence a measurement result of a distance D (x, y) has low reliability. In contrast, if the reflection light intensity I (x, y) is too small, noise becomes dominant and hence measurement accuracy becomes deteriorated.

<Image Processing Function>

A suitable imaging method using the imaging part 22 is described below.

The imaging part 22 is configured so that exposure time T of the imaging element 22a is adjustable. An appropriate output is therefore obtainable from the imaging part 22 all the time by adjusting the exposure time T according to a distance to the sensing object W and emission intensity of the light source part 21.

The reflection light from the sensing object W includes specular reflection light and diffuse reflection light, which differ from one another in intensity by two orders or more. Therefore, if exposure time is set on the basis of a pixel into which the specular reflection light enters, the exposure time is not enough for a pixel into which only the diffuse reflection light enters, thus being more subjected to the influence of noise. In contrast, if exposure time T is set on the basis of a pixel into which only diffuse reflection light enters, the exposure time T becomes excessive for a pixel into which the specular reflection light enters, thus resulting in an overflow state.

Figure 10:
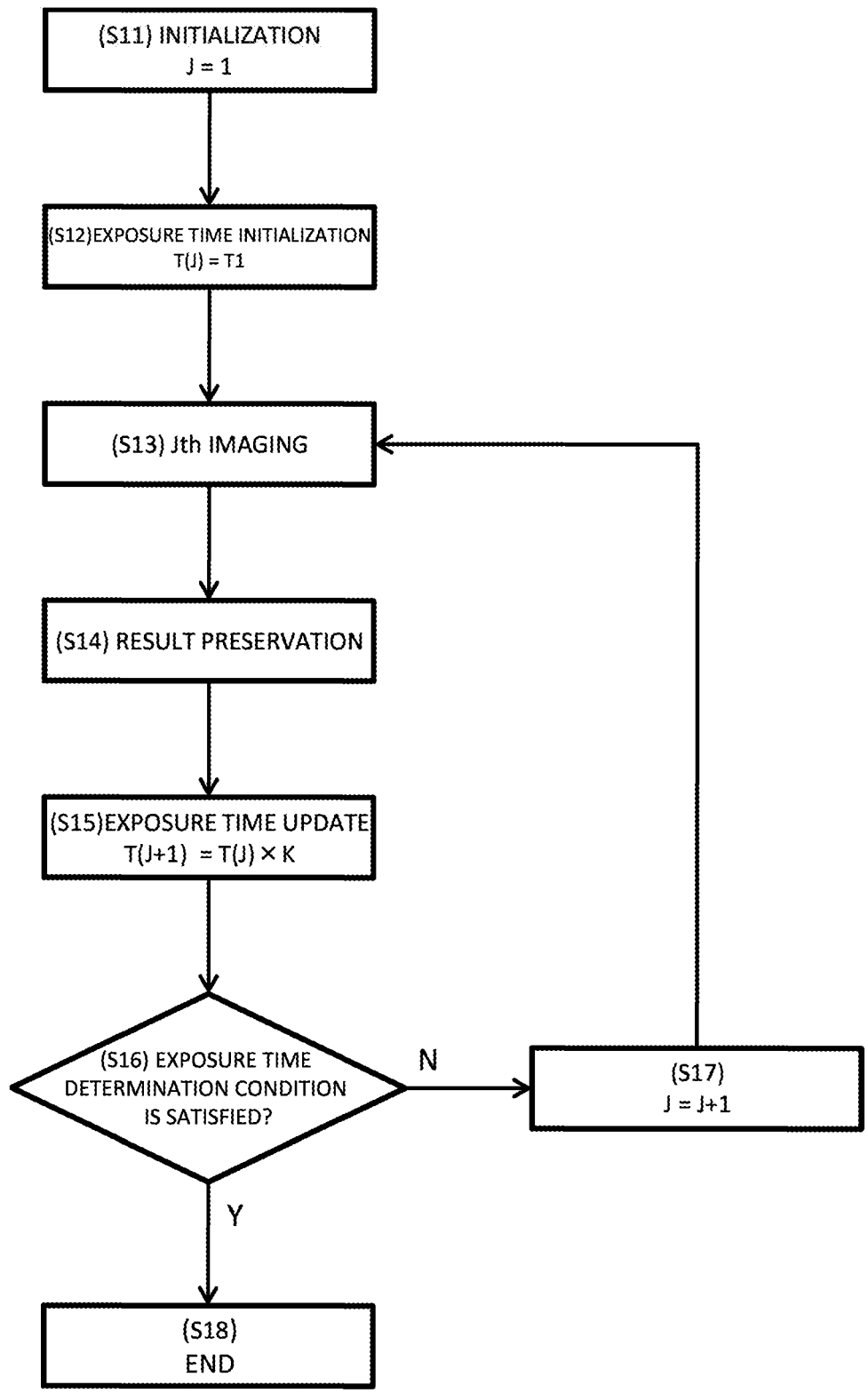
FIG. 10 is a flowchart of an imaging method in the surface characteristic inspection apparatus of the embodiment.

The present embodiment therefore employs an imaging method (shooting method) including the following steps as illustrated in FIG. 10.

(S11) Initialization

The imaging part 22 sets an initial value to a counter J. The initial value is J=1.

(S12) Initialization of Exposure Time T (1)(1)

The imaging part 22 sets an initial value T1 to exposure time T (1)(1) in a first imaging. The initial value T1 is, for example, 500 microseconds.

(S13) Jth Imaging

Then, the imaging part 22 carries out a Jth imaging in the set exposure time T (J).

(S14) Result Preservation

This includes preserving an imaging result in a Jth memory region M (J) disposed on the imaging part 22, followed by recording a distance D (x, y) to the sensing object W and reflection light intensity I (x, y).

(S15) Exposure Time Update

This includes setting exposure time T (J+1) in the next imaging.

Specifically, T (J+1)=T (J)×K where a coefficient K is, for example, 0.1. Consequently, the exposure time T (J+1) becomes shorter.

(S16) Exposure Time Determination

This includes comparing the exposure time T (J+1) with a threshold value T2.

If the exposure time T (J+1) already satisfies conditions, it proceeds to (S18) to terminate the imaging.

The conditions are, for example, T<T2 if the exposure time is made shorter. The threshold value T2 is set to, for example, 5 microseconds.

(S17) J=J+1

The imaging part 22 increases a counter J (J=J+1) to return to (S13), and carries out the next imaging.

(S18) Imaging Termination

By carrying out the imaging in the above manner, the results obtained by imaging in at least two kinds of exposure times T (J) are preserved in the memory region M (J).

For example, a result obtained by imaging in the exposure time of T (1)=500 microseconds is preserved in the memory region M (1) by the J=1st imaging. A result obtained by imaging in the exposure time of T (2)=50 microseconds is preserved in the memory region M (2) by the J=2nd imaging. A result obtained by imaging in the exposure time of T (3)=5 microseconds is preserved in the memory region M (3) by the J=3rd imaging.

The result having appropriate reflection light intensity I (x, y) may be preferentially selected from among the preserved memory regions M (1), M (2) and M (3). The distance D (x, y) measured under conditions where the intensity I (x, y) is appropriate is also selectable at the same time, thereby further enhancing measurement accuracy of the distance D (x, y).

Because the overflow state occurs in a state in which the exposure time T (J) is excessive, it is difficult to accurately measure the distance to the sensing object W. However, if imaged according to the flowchart illustrated in FIG. 10, the imaging is carried out even under the conditions where the exposure time T (J) is sufficiently short (for example, T (3)=5 microseconds, a first light receiving mode). Therefore, no overflow state occurs even at a pixel into which the specular reflection light enters, thus leading to accurate distance measurement.

If the exposure time T (J) becomes insufficient in the pixel into which only the diffusion light enters, noise becomes dominant and it is therefore difficult to accurately measure the distance. However, if imaged according to the flowchart illustrated in FIG. 10, the imaging is carried out even under the conditions where the exposure time T (J) is set appropriately set (for example, T (1)=500 microseconds, a second light receiving mode). This ensures accurate distance measurement even in the pixel into which only the diffuse reflection light enters.

In the flowchart in FIG. 10, the imaging time T (J) is employed as a determination criterion in (S16). Alternatively, a maximum value in all pixels in terms of the reflection light intensity I (x, y) may be employed as a determination criterion. Specifically, it is possible to employ a method including terminating the imaging if the maximum value Imax of the reflection light intensity I (x, y) in the Jth imaging result is smaller than a predetermined value. For example, if the sensing object seems to be a complete diffusion surface, no specular reflection light enters there. Hence, only one imaging ensures a state in which the reflection light intensity I (x, y) is appropriate for all pixels, thus leading to enhanced measurement accuracy of the distance D (x, y) measured for all the pixels. This eliminates the need to carry out a second imaging.

Alternatively, a minimum value Imin of reflection light intensity I (x, y) in the Jth imaging may be compared with a predetermined value. In this case, exposure time becomes insufficient for a pixel whose reflection light intensity I (x, y) is small, and therefore, imaging for longer exposure time (J) becomes necessary, and the coefficient K in (S15) is set to a value larger than 1 (the exposure time is made longer).

The coefficient K in (S15) need not be a fixed value, but may be changed according to a value of the counter J. For example, setting may be made so that K=0.1 when J=1, and K=0.2 when J=2. In order to reduce measurement time by decreasing the number of imaging, it is preferable to considerably change the exposure time T (J). However, a significant change in exposure time T (J) may cause an ambiguous pixel. For example, if k=0.01, J=1st imaging causes the overflow state, and J=2nd imaging generates a pixel that lacks exposure time. It is important to set the value of the coefficient K so as to avoid occurrence of the ambiguous pixel while decreasing the number of imaging. For this purpose, the value of K may be changed dynamically.

For example, after the J=1st imaging, J=2nd imaging is carried out under the condition that K=0.01. If the J=2nd imaging result shows that the maximum value Imax of the reflection light intensity I (x, y) is larger than a predetermined value, J=3rd imaging is carried out under the condition that K=0.1. If the J=3rd imaging result shows that the minimum value Imin of the reflection light intensity I (x, y) is smaller than a predetermined value, J=4th imaging is carried out under the condition that K=1.5 by reversely increasing the exposure time (J).

Thus, the value of K may be changed dynamically. In order that the exposure time (J) for each pixel is individually settable, the value of K may be change per pixel or predetermined small region (a part of pixels).

Although the exposure time T (J) of the imaging part 22 is changed in the foregoing description, the emission intensity of the light source part 21 may be changed. Alternatively, both may be changed in combination. Regarding the emission intensity of the light source part 21, output itself of the light source 21a may be changed or, alternatively, a neutral-density filter or the like may be inserted and extracted. Still alternatively, a variable aperture may be disposed in the imaging part 22.

Besides the above, measurement results of intensity I (x, y) and distance D (x, y) each having higher accuracy are obtainable by carrying out imaging as many as possible so as to select a more appropriate result from a larger number of memory regions M (J), while finely changing the exposure time T (J). There is, however, a disadvantage that the measurement time becomes longer with increasing the number of imaging. The number of imaging is set to three times in the present embodiment taking the disadvantage into consideration.

Regarding the distance D (x, y) to the sensing object, it is unnecessary to obtain "an appropriate state in all pixels." This is because the sensing object W is not imaged in all the pixels, but a background is usually present. Because the background is far away, no reflection light may return even by setting to settable maximum exposure time. Hence, the imaging may suspend in a fixed number, instead of changing the exposure time T (J) so as to obtain "the appropriate state in all pixels."

With the above imaging method, the imaging is carried out Je times (Je is, for example, Je=3) while changing the exposure time T (J). With the imaging part 22 in the present embodiment, the distance D (x, y) to the sensing object W and the reflection light intensity I (x, y) from the sensing object W with respect to a plurality of pixels P (x, y) are measurable by carrying out one-time imaging. Accordingly, measurement results of Je pieces of distances D (x, y) and reflection light intensities I (x, y) with respect to each of the pixels P (x, y) are preserved in the memory regions M (1) to M (Je). A method for selecting therefrom an appropriate distance D (x, y) and appropriate reflection light intensity I (x, y) for each pixel P (x, y) is described below. For the sake of simplicity, the following description is given assuming that a selected result is stored in another memory region M (Je+1).

Firstly, the memory regions M (J) are rearranged. The memory regions M (J) are replaced (swapped) on an imaging result basis so that the imaging results are arranged in the order of decreasing exposure time T (J). This results in that the exposure time T (J) of the memory regions M (J) is expressed as T (1)>T (2)>T (3) . . . . Naturally, because the region of M (Je+1) is a region for storing results, this region is excluded from replacement objects. This replacement itself is unnecessary if imaged by fixing to K=0.1 while reducing the exposure time T (J) in the flowchart illustrated in FIG. 10.

Subsequently, an appropriate distance D (x, y) and appropriate reflection light intensity I (x, y) are selected for each pixel according to a method illustrated in the flowchart of FIG. 11.

(S21) Initialization

The imaging part 22 sets an initial value to the counter J. The initial value is J=1.

(S22) Storage Region Initialization

All the memory regions M (Je+1) storing selection results therein are also reset.

That is, an initial value (for example, zero) is substituted into the memory regions M (Je+1).

(S23) Loop Start

The following S24 to S26 are repeated for each pixel P (x, y).

(S24) Storage Region State Determination

The imaging part 22 examines states of reflection light intensity I (x, y) in the regions M (Je+1) storing the selection results therein.

If the reflection light intensity is already set, it proceeds to (S27).

If not yet set, the reflection light intensity I (x, y) is the initial value (for example, zero).

(S25) Imaging Result State Determination

If a result of a comparison of the reflection light intensity I (x, y) of the memory region M (J) that is the Jth imaging result with a predetermined threshold value I1 satisfies a condition, it proceeds to (S27).

The above condition is, for example, I (x, y)≥I1.

(S26) Selection Result Storing

A determination is made that the Jth imaging result is an appropriate result, and the imaging part 22 stores the value of the distance D (x, y) and the value of the reflection light intensity I (x, y) into the memory region M (Je+1).

That is, the value of distance D (x, y) is stored directly therein. In terms of reflection light intensity I (x, y), one which is obtained by multiplying a ratio of the first exposure time and the Jth exposure time, T(1)/T(J), is stored therein.

(S27) Loop Termination

If processing for all the pixels are already terminated, it proceeds to (S28).

If not, it returns to (S23).

(S28) Imaging Number Determination

If the counter J is Je, it proceeds to (S30) to carry out termination.

If not, the counter J is increased (J=J+1) in (S29), and it returns to (S23).

In general, a measurement result less affected by noise is obtainable as the exposure time T (J) in imaging becomes longer. In the flowchart illustrated in FIG. 11, a measurement result obtained in the longest exposure time T(J) is searched most preferentially, in other words, the measurement results are searched in the order of decreasing the exposure time T (J). It is therefore possible to select the distance D (x, y) and reflection light intensity I (x, y) measured in longer exposure time T (J). Additionally, because a pixel thus selected is already subjected to a determination as to whether it is already set in (S24), there is no possibility of being overwritten with a measurement result obtained in short exposure time T (J).

In contrast, excessive exposure time T (J) may cause the overflow state, thus degrading accuracy of measurement results. However, because the reflection light intensity I (x, y) is compared with the threshold value I1 in the flowchart illustrated in FIG. 11, it is possible to detect whether the pixel is in the overflow state, thus having a characteristic feature to select neither the distance D (x, y) nor reflection light intensity I (x, y) in the overflow state. Then, the loop of S23 to S27 is resumed by increasing the value of the counter J in (S29), thereby having a characteristic feature that makes it possible to select a distance D (x, y) and reflection light intensity I (x, y) of the imaging result obtained in shorter exposure time T (J).

As a specific value of the threshold value I1, the following value may be set. If the reflection light intensity I (x, y) outputted from the imaging part 22 is normalized to, for example, 8-bit integers, I (x, y) takes a value in the range of 0 to 255. In this case, a possible maximum value 255 may be employed as the threshold value I1. Alternatively, for example, approximately 90% of the value I1=230 may be employed as the threshold value I1.

Figure 11:
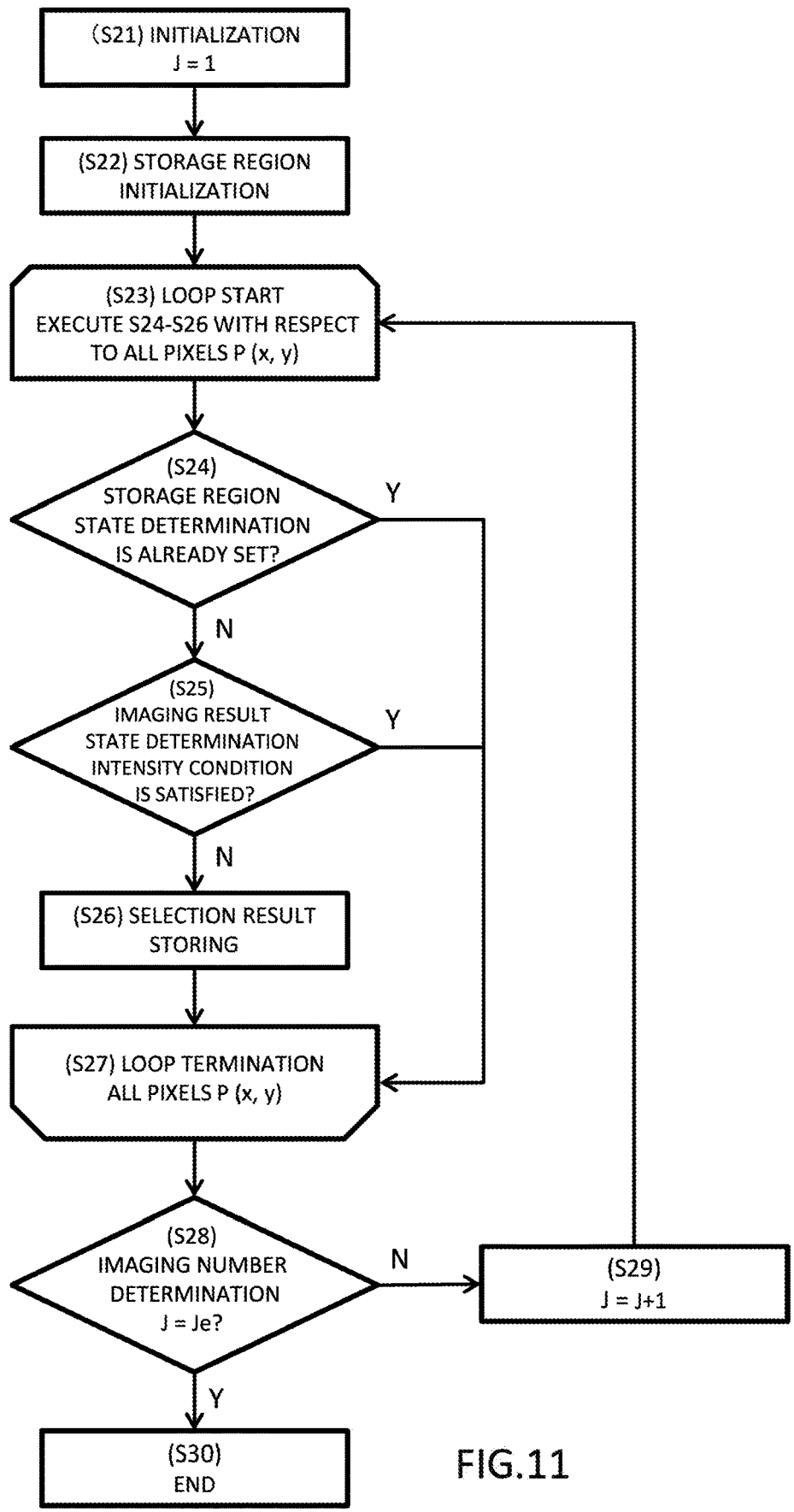
FIG. 11 is a flowchart of a data processing method in the surface characteristic inspection apparatus of the embodiment.

As illustrated in the flowchart of FIG. 11, a result obtained by multiplying a ratio of the first exposure time T (1) and the Jth exposure time T (J), namely, T (1)/T (J) by the reflection light intensity I (x, y) is stored in the memory region m (Je+1) in (S26). For example, in cases where, after a first imaging in exposure time of T (1)=500 microseconds, a second imaging is carried out in exposure time of T (2)=5 microseconds, a ratio between the two, T (1)/T (2), becomes 100 times. Specifically, because the exposure time reaches $\frac{1}{100}$ in the second imaging, a result obtained by multiplying the second measured reflection light intensity I (x, y) by 100 is designed to be stored in the memory region M (Je+1). This leads to a characteristic feature that a dynamic range of the reflection light intensity I (x, y) can be enlarged (HDR synthesis) by an amount of the ratio of the exposure time T (J).

Although the reflection light intensity I (x, y) is compared with the threshold value I1 in (S25), other method may be used to detect the overflow state. With the imaging part 22 in the present embodiment, reliability of the distance D (x, y) to the sensing object W and the reflection light intensity I (x, y) can be evaluated by monitoring a charge accumulation state from exposure initiation to exposure termination. This evaluated reliability may be used to make the determination in (S25).

For more detail, a temporal change in charge accumulation amount (a derivative value of the charge accumulation amount) becomes constant under an appropriate exposure state. However, because the temporal change in charge accumulation amount is subjected to a rapid decrease under the overflow state, the rapid decrease may be detected to determine the reliability.

Besides the above, not only the overflow state but also a determination as to whether the exposure time T (J) is insufficient or not is usable for evaluating the reliability. In this case, a temporal change in charge accumulation amount fluctuates every hour, and hence, a variance value may be checked to make a determination.

Effects of Present Embodiment

The surface characteristic inspection apparatus 100 in the present embodiment includes the display control part 3c (guidance information generation part and informing part) that generates the guidance information about the distance and attitude of the detection device 2 relative to the sensing object W and informs the guidance information. A user is therefore capable of adjusting a position of the detection device 2 on the basis of the information, and easily performing positioning of the detection device 2 when detecting the surface characteristics of the sensing object W. Because the display control part 3c displays the guidance information on the display 31, the user is capable of recognizing the guidance information at a glance.

Other Modified Embodiments

The present invention is not limited to the above embodiment.

For example, the display control part 3c in the above embodiment is designed to display on the display 31 a direction to move as guidance information. Alternatively, when the detection device 2 is already moved to a position suitable for measurement, the display control part 3c may carry out a display indicating this. When the detection device 2 is not yet moved to the position suitable for measurement, the display control part 3c may carry out a display indicating this.

Still alternatively, the display control part 3c may display on the display 31 a brightness image itself, a depth image itself, a distance itself relative to a sensing object W, or an attitude itself, such as an angle and a direction relative to the sensing object W, as guidance information. With this configuration, a way to move the detection device 2 relative to the sensing object W (for example, whether to move quickly, whether to move roughly, or whether to move carefully) is recognizable from contents displayed on the display 31.

It is also possible to make a determination that the detection device 2 is put at the position suitable for measurement when an image of specular reflection light displayed on the display 31 reaches a predetermined position and a predetermined size on the display 31. Therefore, the display control part 3c may carry out a display indicating that the image of the specular reflection light on the display 31 reaches the predetermined position and size.

The informing part that informs the information about the distance and attitude of the detection device 2 is configured by the display control part 3c in the above embodiment. Alternatively, the informing part may be configured by using a sound output means, such as a speaker, or a light output means, such as an LED. The display control part 3c may not have the function of generating the guidance information, and a guidance information generation part may be disposed separately from the display control part 3c. The guidance information generation part may directly output a distance obtained by the processing part 3b (distance calculation part) and a rotation angle obtained by the processing part 3b (attitude calculation part) to the display control part 3c (informing part).

Additionally, the processing part 3b may recognize a surface shape (for example, a flat surface or curved surface) of the sensing object W by using data from the imaging part 22, and may correct surface characteristics, such as a brightness distribution and a reflectance, according to the surface shape. Specifically, the processing part 3b recognizes the surface shape of the sensing object W from the depth image data from the imaging part 22. The processing part 3b obtains the brightness distribution and reflectance by correcting the brightness image data from the imaging part 22 according to the recognized surface shape.

The surface characteristic inspection apparatus 100 in the above embodiment may further include a surface characteristic calculation part and a machine learning part. The surface characteristic calculation part calculates surface characteristics of a sensing object W by using a transformed image obtained by the processing part 3b. The machine learning part generates a learning model by a machine learning using a leaning data set composed of a transformed image obtained by subjecting an image taken by the imaging part 22 to nonlinear transformation, and a surface characteristic label corresponding to the transformed image. The surface characteristic calculation part may be designed to calculate surface characteristic of the sensing object on the basis of the learning model. The surface characteristic calculation part calculates the surface characteristics of the sensing object by using a brightness distribution in a predetermined direction in the transformed image. Specifically, the surface characteristic calculation part calculates the surface characteristics of the sensing object by using a brightness distribution in a brightness extending direction in the transformed image.

Although the imaging part in the above embodiment is designed to use the TOF camera, a depth image may be obtained by one which uses a stereo camera, projects a pattern, or irradiates ultrasonic waves.

Furthermore, the surface characteristic inspection apparatus may be configured by applying a portable terminal, such as a smartphone, to the apparatus body in the above embodiment, by attaching the detection device to the portable terminal, and by installing an application program on the portable terminal.

Besides the above, various modifications and combinations of embodiments may be made without departing from the true spirit and scope of the present invention.

INDUSTRIAL APPLICABILITY

With the present invention, it is easy to perform positioning of the detection device when detecting surface characteristics of a sensing object.

What is claimed is:

1. A surface characteristic inspection apparatus, comprising:
    a detection device to detect reflection light from a sensing object by irradiating light onto the sensing object; and
    a computer including a processor configured to:
        calculate surface characteristics including at least one of glossiness, surface roughness, and surface texture of the sensing object by processing data from the detection device;
        generate guidance information about an attitude of the detection device relative to the sensing object, the guidance information being for a user to position the detection device to meet an attitude so that the detection device receives specular reflection light reflected at a predetermined angle relative to a normal line of a surface of the sensing object irradiated with the light from the detection device in order to calculate the surface characteristics;
        inform the user of the guidance information about the attitude generated by the computer; and
        display a guidance indication on a display to direct the user to move the detection device to meet the attitude suitable for receiving the reflected light based on the guidance information.

2. The surface characteristic inspection apparatus according to claim 1, wherein
    the detection device comprises a plurality of two-dimensionally arranged light-receiving elements, and
    the computer generates the guidance information using distance information from the sensing object to the detection device from the plurality of light-receiving elements.

3. The surface characteristic inspection apparatus according to claim 1, wherein
    the detection device further comprises a light source to irradiate light onto the inspection object, and modulates emission intensity of the light source at a predetermined frequency, and
    the computer calculates surface characteristics of the sensing object by using a light intensity signal synchronized with a modulation frequency of the emission intensity.

4. The surface characteristic inspection apparatus according to claim 3, wherein the computer calculates a reflectance of the sensing object from the light intensity signal synchronized with the modulation frequency of the emission intensity.

5. The surface characteristic inspection apparatus according to claim 1, wherein the detection device is designed to generate data comprising distance information about the sensing object and brightness information about the sensing object.

6. The surface characteristic inspection apparatus according to claim 1, comprising a first light receiving mode to receive the specular reflection light from the sensing object, and a second light receiving mode to receive diffuse reflection light from the sensing object.

7. The surface characteristic inspection apparatus according to claim 6, wherein the computer calculates surface characteristics of the sensing object by using data from the detection device in the first light receiving mode and data from the detection device in the second light receiving mode.

8. The surface characteristic inspection apparatus according to claim 1, wherein the computer calculates a brightness distribution of the sensing object by using data from the detection device, and displays the brightness distribution on the display.

9. A recording medium that stores a surface characteristic inspection program for causing a computer to:
   accept data from a detection device designed to detect reflection light from a sensing object by irradiating light onto the sensing object;
   calculate surface characteristics including at least one of glossiness, surface roughness, and surface texture of the sensing object by processing data from the detection device;
   generate guidance information about an attitude of the detection device relative to the sensing object, the guidance information being for a user to position the detection device to meet an attitude so that the detection device receives specular reflection light reflected at a predetermined angle relative to a normal line of a surface of the sensing object irradiated with the light from the detection device in order to calculate the surface characteristics; and
   display a guidance indication on a display to direct the user to move the detection device to meet the attitude suitable for receiving the reflected light based on the guidance information about the attitude generated by the computer.

10. A surface characteristic inspection apparatus, comprising:
    a detection device to detect reflection light from a sensing object by irradiating light onto the sensing object; and
    a computer including a processor configured to:
    calculate surface characteristics of the sensing object by processing data from the detection device;
    generate guidance information about one or both of a distance and an attitude of the detection device relative to the sensing object, the guidance information being for a user to position the detection device to meet one or both of a distance and an attitude suitable for the detection device to detect the reflected light to calculate the surface characteristics; and
    inform the user of the guidance information about one or both of the distance and the attitude generated by the computer, wherein
    the surface characteristics includes at least one of glossiness, surface roughness, and surface texture,
    the detection device comprises a plurality of two-dimensionally arranged light-receiving elements, and each of the light-receiving elements is capable of detecting the distance from the sensing object to the detection device individually,
    the computer generates the guidance information using distance information from the sensing object to the detection device from the plurality of light-receiving elements, and
    the computer displays a guidance indication on a display to direct the user to move the detection device to meet one or both of the distance and the attitude suitable for detecting the reflected light based on the guidance information.

11. The surface characteristic inspection apparatus according to claim 10, wherein the computer generates the guidance information about the attitude to establish the attitude so that the detection device receives reflection light reflected at a predetermined angle relative to a normal line of a surface of the sensing object irradiated with the light from the detection device.

12. The surface characteristic inspection apparatus according to claim 11, wherein the reflection light is specular reflection light.

* * * * *